(12) United States Patent
Wilson (10) Patent No.: US 10,928,566 B2
(45) Date of Patent: Feb. 23, 2021

(54) TRANSPARENT INFRARED REFLECTIVE LAYER FOR A COMPUTING DEVICE

(71) Applicant: Apple Inc., Cupertino, CA (US)

(72) Inventor: James R. Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1264 days.

(21) Appl. No.: 14/830,260

(22) Filed: Aug. 19, 2015

(65) Prior Publication Data

US 2017/0052292 A1 Feb. 23, 2017

(51) Int. Cl.
*G02B 5/20* (2006.01)
*G02B 5/26* (2006.01)
*G02B 1/00* (2006.01)
*C09D 5/33* (2006.01)

(52) U.S. Cl.
CPC ............. *G02B 5/208* (2013.01); *C09D 5/004* (2013.01); *G02B 1/005* (2013.01); *G02B 5/26* (2013.01)

(58) Field of Classification Search
None
See application file for complete search history.

(56) References Cited

U.S. PATENT DOCUMENTS

| | | | |
|---|---|---|---|
| 6,813,094 B2 | 11/2004 | Kaminsky et al. | |
| 6,842,282 B2 | 1/2005 | Kuroda et al. | |
| 7,760,424 B2 | 7/2010 | Takeuchi et al. | |
| 7,924,368 B2 | 4/2011 | Fabick et al. | |
| 8,009,351 B2 | 8/2011 | Ando et al. | |
| 9,030,736 B2 | 5/2015 | Sadahiro et al. | |
| 9,081,171 B2 | 7/2015 | Dean et al. | |
| 2006/0078268 A1* | 4/2006 | Chen | B82Y 20/00 385/147 |
| 2007/0103799 A1 | 5/2007 | Chiang et al. | |
| 2012/0218653 A1 | 8/2012 | Liu et al. | |
| 2013/0107246 A1* | 5/2013 | Yang | G02B 5/208 356/51 |
| 2014/0118815 A1* | 5/2014 | Cho | G02B 5/206 359/278 |
| 2014/0178647 A1* | 6/2014 | Kim | B44C 5/0407 428/166 |
| 2014/0233161 A1 | 8/2014 | Liu | |
| 2014/0295127 A1 | 10/2014 | Tang et al. | |
| 2015/0062709 A1 | 3/2015 | Matsuyuki et al. | |
| 2017/0023806 A1* | 1/2017 | Wehlus | G02F 1/0126 |

FOREIGN PATENT DOCUMENTS

KR 101336936 12/2013

* cited by examiner

*Primary Examiner* — Darryl J Collins
*Assistant Examiner* — Journey F Sumlar
(74) *Attorney, Agent, or Firm* — David K. Cole (57) ABSTRACT

Disclosed herein is an infrared reflective coating for use on an electronic device. More specifically, the infrared reflective includes an array of polymer structures spaced and sized in such a manner as to reflect infrared light. Thus, when the coating is placed on one or more surfaces or components of the electronic device, that surface or component reflects infrared light and the heat associated with the infrared light instead of absorbing it.

17 Claims, 5 Drawing Sheets

FIG. 6

TRANSPARENT INFRARED REFLECTIVE LAYER FOR A COMPUTING DEVICE

FIELD

The described embodiments relate generally to an infrared reflective layer or coating for an electronic device. More particularly, the disclosed embodiments relate to a transparent infrared reflective layer that includes a group of photonic crystals that are arranged, sized and spaced to reflect infrared light, and thermal radiation from the infrared light, away from the electronic device in order to control the temperature of the electronic device.

BACKGROUND

When an electronic device, or any other device, is outside or in another environment in which infrared light is present, the electronic device may absorb thermal radiation (e.g., heat). Although infrared reflecting or absorbing layers and coatings exist, these layers or coatings are typically pigmented and, as a result, have a particular hue and opacity. Thus, if these layers or coatings are applied to an electronic device, the overall aesthetic look of the electronic device may change. In addition, these pigmented layers have a limited ability to reflect light and thermal radiation and in some cases, these layers or coatings absorb heat from the infrared light.

In other implementations, a physical vapor deposition (PVD) process may be used to deposit an infrared reflecting and/or absorbing thin film layer on a surface. However, this process is expensive and difficult to implement.

SUMMARY

Disclosed herein is an infrared reflective layer or coating that may be applied to an electronic device (or to any other device, surface or structure) to control the temperature of the electronic device by preventing the electronic device from absorbing thermal radiation or heat from the infrared light. The infrared reflective layer described herein is transparent. As a result, the infrared reflective layer may be applied to a cover glass of a display or a housing of an electronic device without affecting the quality of images that are output on the display or the aesthetics of the electronic device.

The infrared reflective layer includes a group of transparent particles or other transparent material arranged in a cubic lattice or three-dimensional array. More specifically, the particles have a first refractive index and are suspended in a material having a second refractive index. The second refractive index has a minimum threshold difference from the first refractive index. The particles are sized and spaced in such a manner as to reflect infrared light from a surface of the device while enabling visible light to pass through the infrared reflective layer.

Accordingly, disclosed herein is an electronic device having a cover glass and an infrared reflective layer disposed on or otherwise adjacent the cover glass. The infrared reflective layer includes a first material having a first refractive index and a second material having a second refractive index. The second material is formed in a three-dimensional array and is spaced to reflect infrared light.

Also disclosed is a substrate for an electronic device. The substrate includes a first reflective layer having a first array of photonic crystals that are sized and spaced to reflect a first wavelength of light. The substrate also includes a second infrared layer that is adjacent the first reflective layer. The second reflective layer includes a second array of photonic crystals that are sized and spaced to reflect a second wavelength of light that is different than the first wavelength of light.

A method for coating a component of an electronic device with an infrared reflective layer is also disclosed. According to this method, a group of polymeric structures is suspended in a liquid. Each polymeric structure in the group of polymeric structures has a defined inner diameter and a defined outer diameter. The liquid containing the polymeric structures is applied to a surface of the component. Once the liquid is applied to the component, the liquid is evaporated thereby creating an infrared reflective layer or coating on the surface of the component of the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to a transparent infrared reflective layer or coating that may be applied to one or more surfaces of an electronic device. For example, the infrared reflective layer described herein may be applied to any surface of the electronic device to help prevent the electronic device from absorbing thermal radiation or heat from infrared light. The infrared reflective layer may be applied to a housing of the electronic device, a cover glass or other display component of the electronic device and so on. In other implementations, the infrared reflective layer may be applied to one or more electronic components of the electronic device, such as, for example, an infrared cut-off filter, a sensor and the like.

The infrared reflective layer typically includes a first transparent or effectively transparent material that is suspended or otherwise arranged in a second transparent or effectively transparent material. More specifically, the first transparent material may include a group of photonic crystals (or a photonic crystal structure) that are arranged, sized and spaced from each other in order to reflect infrared light. Due to the size, spacing and arrangement of the photonic crystals within the infrared reflective layer, infrared light and thermal radiation is reflected from the layer while visible light is permitted to pass through.

For example, in some implementations, the photonic crystals are arranged in a three-dimensional array or cubic lattice. The periodic nature of the array or the lattice affects the amount of infrared light that is reflected. Thus, the better the alignment of the photonic crystals within the infrared reflective layer, the more effective the infrared reflective layer will be.

As used herein, the term photonic crystal refers to a particle, a material, a crystal (e.g., a synthetic crystal), or a structure (e.g., a synthetic structure) that can be adapted and/or arranged to manipulate specific wavelengths of light, be sensitized to specific wavelengths of light and/or to otherwise respond to and/or reflect specific wavelengths of light. Accordingly, the photonic crystals used in the various embodiments described herein may include: 1) polymer structures; 2) polymer spheres; 3) spheres or such shapes and/or structures that can be etched (e.g., laser etched, chemically etched and so on) on a substrate, a surface or other material; 4) structures that may be printed or lithographed onto a substrate; 5) polymer beads; 6) capsules or other structures having particles suspended therein and so on.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
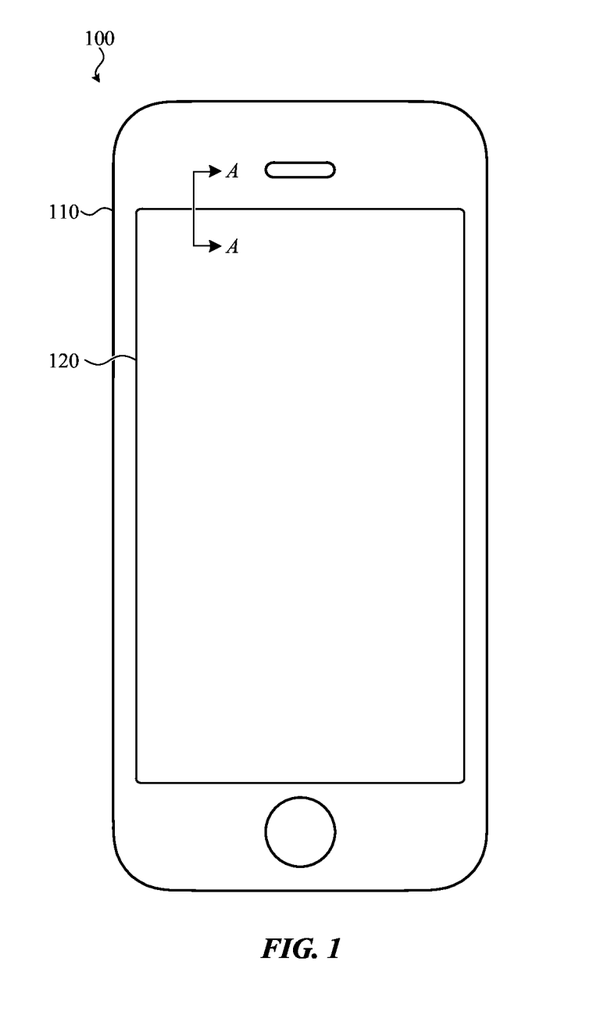
FIG. 1 shows an example electronic device that may use the infrared reflective layer described herein according to one or more embodiments of the present disclosure.

FIG. 1 shows an example electronic device 100 that may use the infrared reflective layer described herein according to one or more embodiments of the present disclosure. As shown in FIG. 1, the electronic device 100 is a mobile telephone. Although a mobile telephone is shown, the infrared reflective layer described herein may be used in a variety of electronic devices including, but not limited to, tablet computers, laptop computers, wearable electronic devices, time keeping devices, global positioning systems, and so on.

Although electronic devices are specifically mentioned, the infrared reflective layer may be used with any number mechanical devices, electro-mechanical devices and other structures or surfaces on which it would be beneficial to reflect infrared light (e.g., windows).

The electronic device 100 includes, among other components, a housing 110 and a cover glass 120. The cover glass 120 may be part of a display stack of the electronic device 100. As will be described below, the infrared reflective layer may be adjacent to the cover glass 120, adjacent the housing 110, or both. For example, the infrared reflective layer may be provided on the entire cover glass 120 or on select portions or areas of the cover glass 120. In another implementation, the infrared reflective layer may be provided on the entire housing 110 or on select areas of the housing 110. For example, the infrared reflective layer may be applied on an exposed back surface of the housing 110.

In yet another implementation, the cover glass 120 may have a first infrared reflective layer that is tuned to reflect a first frequency band of infrared light while the housing 110 may have a second infrared reflective layer that is tuned to reflect a second frequency band of infrared light.

Regardless of where the infrared reflective layer is located or how it is patterned on the electronic device, the infrared reflective layer may help control the temperature of the electronic device without affecting the aesthetics of the electronic device 100 and/or without affecting the visible light transmitted by the display through the cover glass 120.

Figure 2A:
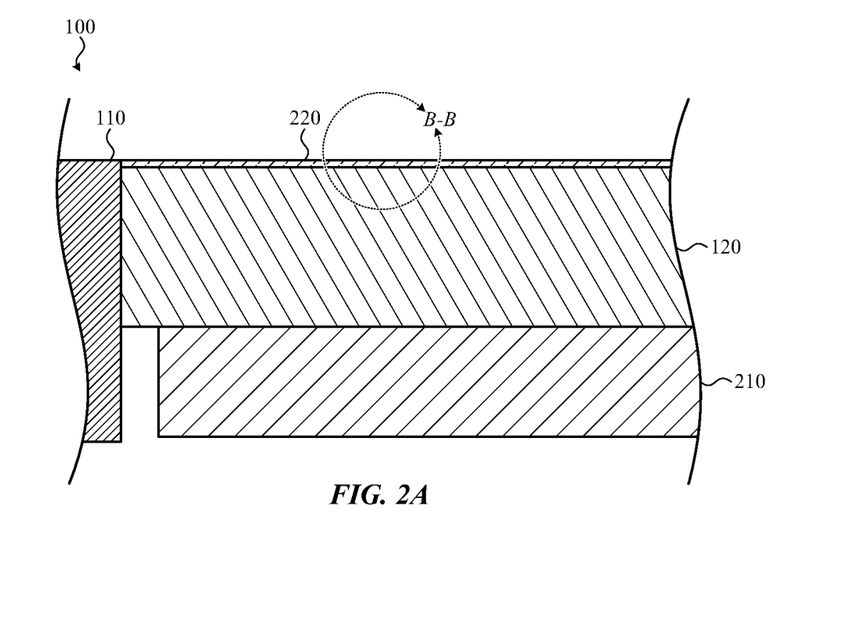
FIG. 2A illustrates a cross-section view of the electronic device of FIG. 1 taken along line A-A according to one or more embodiments of the present disclosure.

FIG. 2A illustrates a cross-section view of the electronic device of FIG. 1 taken along line A-A according to one or more embodiments of the present disclosure. As shown in FIG. 2A and described above, the electronic device 100 includes a housing 110. The housing 110 may at least partially surround a cover glass 120. As also shown in FIG. 2A, the cover glass 120 may be adjacent or disposed on a display stack 210.

An infrared reflective layer 220 may be adjacent the cover glass 120. For example, the infrared reflective layer 220 may be positioned above or otherwise be layered on a top surface of the cover glass 120. The infrared reflective layer 220 may also be positioned below or otherwise be layered on a bottom surface of the cover glass 120. In addition, an infrared reflective layer 220 may be adjacent both the bottom surface of the cover glass 120 and the top surface of the cover glass 120. Because the infrared reflective layer 220 is transparent (but tuned to reflect infrared light), visible light in the form of images, text and other information that is transmitted from the display stack 210 may pass through the infrared reflective layer with little to no effect.

Although the infrared reflective layer 220 is shown extending across the entire surface of the cover glass 120, the infrared reflective layer 220 may be provided on select portions or areas of the cover glass 120. For example, the infrared reflective layer 220 may be used on a black mask or white mask of a display.

As briefly discussed above, the infrared reflective layer 220 may also be provided on the housing 110 or on select portions or areas of the housing 110. For example, the infrared reflective layer 220 may be provided on an exposed or outer surface (e.g., a back cover) of the housing 110 and/or one or more exposed or outer sidewalls of the housing 110.

Although a cover glass 120 and a housing 110 are specifically mentioned, the infrared reflective layer 220 may also be provided on a substrate or other surface. When applied on such a surface, the infrared reflective layer 220 acts to reflect infrared light and prevent the substrate from absorbing thermal radiation.

The infrared reflective layer 220 may be comprised of multiple layers. In such implementations, each layer may be tuned to reflect specific wavelengths of infrared light. For example, a first infrared reflective layer 220 may be positioned on or otherwise adjacent a second infrared reflective layer 220.

As will be discussed in detail below, each infrared reflective layer 220 includes a group of transparent photonic crystals or other materials that are arranged, sized and spaced to reflect infrared light. More specifically, the arrangement, size and the spacing of the photonic crystals in each infrared reflective layer 220 may be tuned to reflect specific frequency bands of infrared light.

Thus, the first infrared reflective layer 220 may reflect a first frequency band of infrared light and the second infrared reflective layer 220 may reflect a second frequency band of infrared light. For example, the first frequency band of infrared light may correspond to wavelengths between approximately 700 nm and approximately 800 nm while the second frequency band of infrared light may correspond to wavelengths between approximately 800 nm and approximately 900 nm.

Although specific wavelengths have been described above, various infrared reflective layers, or various portions of a single infrared reflective layer 220, may be tuned to reflect various frequency bands of infrared light having wavelengths that range from approximately 700 nm to approximately 1400 nm. As the wavelengths of visible light fall within the range of approximately 380 nm to 700 nm, the various infrared reflective layers allow the visible light to pass through.

Figure 2B:
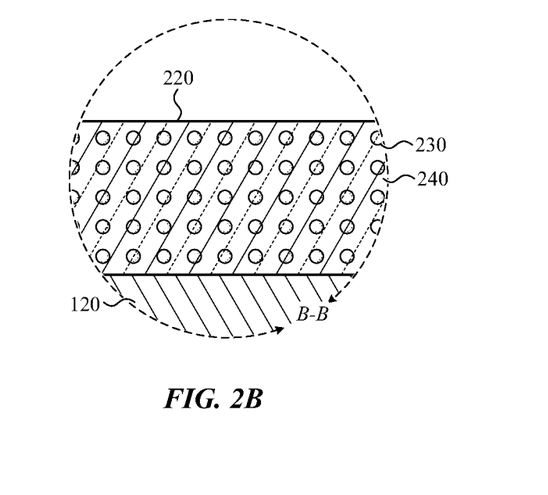
FIG. 2B illustrates region B-B of FIG. 2A including an arrangement of photonic crystals in the infrared reflective layer according to one or more embodiments of the present disclosure.
Figure 3A:
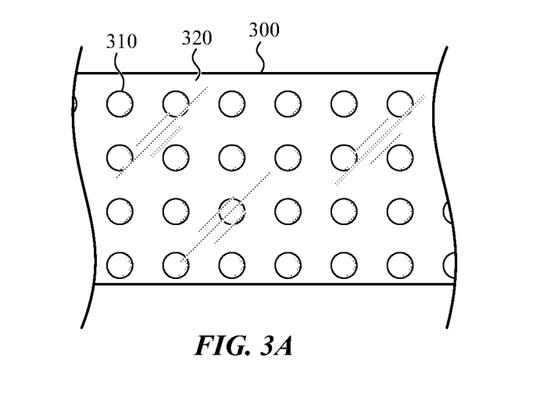
FIG. 3A illustrates an infrared reflective layer according to another embodiment of the present disclosure.
Figure 3B:
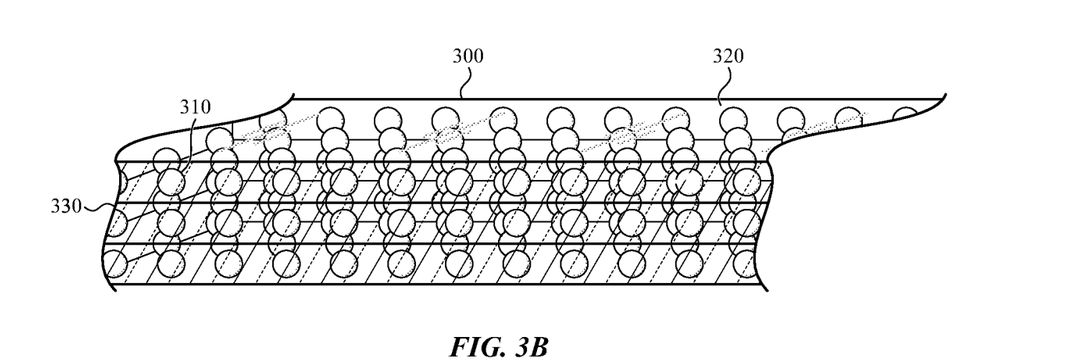
FIG. 3B illustrates a perspective view of the infrared reflective layer of FIG. 3A according to one or more embodiments of the present disclosure.

FIG. 2B illustrates region B-B of FIG. 2A including an arrangement of photonic crystals 230 in the infrared reflective layer 220 according to one or more embodiments of the present disclosure. The photonic crystals 230 may be arranged in a cubic lattice or a three-dimensional array (such as shown in FIG. 3B). That is, the photonic crystals 230 may be arranged in a three-dimensional array comprising between 5-10 rows and 5-10 columns (although fewer or additional rows and columns may be used). As such, the infrared reflective layer 220 may have a thickness of approximately 5 microns or less.

Each photonic crystal 230 in the infrared reflective layer 220 may be suspended within a material 240. The material 240 may be a resin, a clear ink, a liquid, a fluid, a substrate, glass or other such material. The photonic crystals 230 may be transparent or substantially transparent and have a first refractive index. The material 240 may also be transparent or substantially transparent and have a second, different refractive index. The second refractive index may have a minimum threshold difference from the first refractive index.

As discussed above, the photonic crystals 230 may be arranged, sized and spaced in such a manner as to reflect infrared light and thermal radiation while still enabling visible light (e.g., light having wavelengths of 380 nm-700 nm) to pass through the infrared reflective layer 220. However, the size, diameter and spacing of each photonic crystal 230 may vary from row to row, column to column and so on. Further, the orientation of the photonic crystals 230 may vary from row to and/or column to column.

More specifically, photonic crystals 230 having a specific size and spacing reflect wavelengths of light that are approximately twice the size (and/or spacing) of the photonic crystals 230. Thus, photonic crystals 230 having a diameter of approximately 350 nm to approximately 550 nm and that are spaced apart from one another by approximately 350 nm to approximately 550 nm, reflect light having wavelengths of approximately 700 nm to approximately 1100 nm. Although the size and spacing (e.g., the space between each photonic crystal 230 in the array of photonic crystals) is specifically mentioned as being between approximately 350 nm to 550 nm, other diameters and spacing may be used.

For example, the photonic crystal 230 may be used to reflect wavelengths of light other than infrared light. More specifically, the size and spacing of photonic crystals 230 in a reflective layer may be adjusted to reflect wavelengths of visible light, ultraviolet light and so on. In another implementation, the photonic crystal structures may be sized and spaced in a reflective layer to reflect specific colors of visible light.

For example, the color violet has a wavelength of between approximately 380 nm and approximately 450 nm while the color blue has a wavelength of between approximately 450 nm and approximately 495 nm. Accordingly, the photonic crystals 230 may have a diameter of between approximately 190 nm to approximately 225 nm and may be spaced apart from one another by approximately 190 nm to approximately 225 nm. Using this configuration, the reflective layer would reflect violet light but not blue light.

An infrared reflective layer 220 may be comprised of multiple layers with each layer tuned to reflect a specific frequency band of infrared light. In other embodiments, various layers of photonic crystals 230 in the array may be configured to reflect various frequency bands of infrared light. That is, each photonic crystal 230 in a first layer of the array may have a first diameter and/or spacing while each photonic crystal 230 in a second layer of the array may have a second diameter and/or spacing. For example and as stated above, the size, diameter, spacing and orientation of each photonic crystal 230 may vary from row to row, column to column and so on.

For example, each photonic crystal 230 in a first layer of the array may have a diameter and may be spaced apart from each surrounding photonic crystal 230 by approximately 350 nm. Each photonic crystal 230 in a second layer of the array may have a diameter of approximately 450 nm and may be spaced apart from each surrounding photonic crystal by approximately 450 nm. Thus, the first layer of photonic crystals 230 in the array would reflect infrared light having a wavelength of approximately 700 nm while the second layer of photonic crystals 230 in the array would reflect infrared light having a wavelength of approximately 1000 nm.

In still yet another implementation, the diameter of the photonic crystals 230 may be uniform throughout each of the layers in the array while the spacing between each photonic crystal 230 and its surrounding photonic crystal 230 varies. For example, the diameter of each photonic crystal 230 in the array may be approximately 350 nm while the spacing between each photonic crystal 230 may be approximately 550 nm.

In yet another implementation, the spacing between each photonic crystal 230 in the array may change from layer to layer even if the diameter of each photonic crystal 230 remains constant or substantially constant. Stated differently, the size (e.g., diameter) and/or spacing between each photonic crystal 230 may remain constant or substantially constant in the X, Y or Z plane or may vary in one or more of the X, Y and Z plane.

As discussed above, the photonic crystals 230 may be a material, particle or other structure suspended in another material 240. More specifically, each photonic crystal 230 may be a polymer structure such as a polymer sphere, a polymer bead, or a structure having one or more particles suspended therein.

In another embodiment, photonic crystals 230 may be etched in or on a substrate, a film, glass or other such structure. For example, FIG. 3A illustrates an infrared reflective layer 300 having a group of photonic crystals 310 (or other such structures) etched into a surface of a substrate 320. Because the photonic crystals 310 of this particular embodiment are etched into the surface of the substrate 320, the photonic crystals 310 may be referred to as a "negative photonic crystals."

Using this implementation, photonic crystals 310 may be etched directly into a cover glass of an electronic device, such as, for example, cover glass 120 (FIG. 1). In another implementation shown in FIG. 3B, the infrared reflective layer 300 may be comprised of multiple thin layers 330 of a transparent substrate with each layer 330 having one or more photonic crystals 310 etched therein or printed thereon.

For example, one or more photonic crystals 310 may be etched, printed, lithographed or otherwise placed on a first layer of a substrate then subsequently sealed. Additional photonic crystals 310 may then be etched, printed, lithographed or otherwise placed on a second layer of the substrate. Each layer may be bonded or sealed together to preserve the refractive index of each photonic structure when compared with the refractive index of the substrate 320.

In one implementation, two different layers may cooperate to form a single layer of negative photonic crystals. For example, one or more spherical structures may be etched or otherwise formed on a first surface of a first layer while corresponding spherical structures may be etched or otherwise formed on a first surface of a second layer. The first surface of the first layer may be bonded to or otherwise combined with the first surface of the second layer to create a layer of photonic crystal spheres. Although spherical structures are specifically mentioned, other structures are contemplated.

In embodiments where etching is used, the etching process may form a cavity that acts as the photonic crystal 310. The cavity may be filled with air or gas. In another embodiment, the cavity may be formed in a vacuum thereby ensuring the cavity is devoid of matter. Because the cavity includes air, gas or is otherwise devoid of matter, the cavity will have a first refractive index that is different than the refractive index of the substrate 320 in which it is formed. In order to ensure that the photonic crystals 310 maintain the different refractive index, a transparent a seal, such as a laminate, a hard coat, a glue or other such layer may be used to seal the cavity.

The photonic crystals 310 may be arranged in a similar manner as the photonic crystals 230 described above with respect to FIG. 2B. That is, the photonic crystals 310 may be arranged in a three-dimensional array or a cubic lattice. Further, the photonic crystals 310 may have similar sizes and spacing such as described above. For example, the photonic crystals 310 may have the same size (e.g., diameter) and spacing throughout the entire array. In another implementation, the size, spacing and/or orientations of the photonic crystals 310 may vary between layers in the array.

Figure 4:
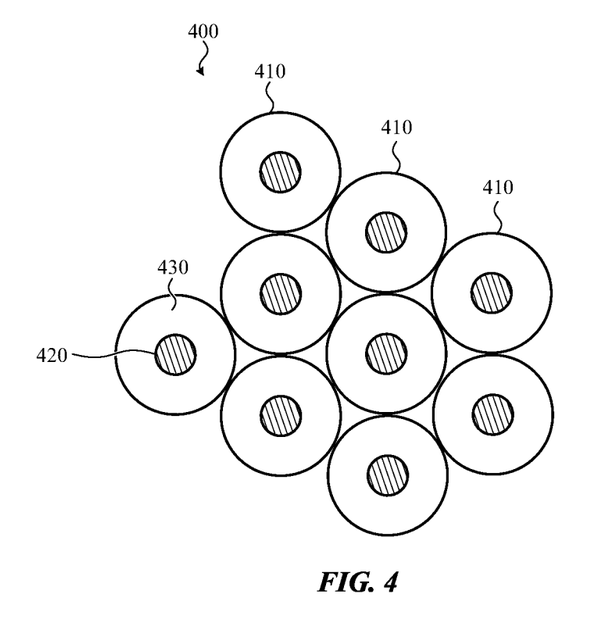
FIG. 4 illustrates an example structure that may be used to produce an infrared reflective layer according to one or more embodiments of the present disclosure.

FIG. 4 illustrates an example photonic crystal structure 400 that may be used to produce an infrared reflective layer according to one or more alternate embodiments of the present disclosure. In this example, the photonic crystal structure 400 includes a group of transparent or substantially transparent photonic crystals 410. Each photonic crystal 410 includes an interior diameter and an exterior diameter. More specifically, each photonic crystal 410 includes a core 420 having a first diameter and a shell 430 having a second diameter. The core 420 may be hollow or may have an air pocket or a gas pocket. In another implementation, the core 420 may be solid or be formed from a liquid material. Likewise, the shell 430 may be filled with a liquid or liquid material. Regardless of the materials used in the core 420 and the shell 430, the core 420 has a first refractive index and the shell 430 has a second refractive index that is different from the first refractive index.

In this particular implementation, each photonic crystal 410 is packed together such as shown in FIG. 4. The diameter of the shell 430 is used as an offset or otherwise creates uniform spacing or substantially uniform spacing between each photonic crystal 410. Like the other implementations described above, the photonic crystals 410 in the photonic crystal structure 400 may be arranged in a three-dimensional array or cubic lattice.

Although the diameter of the core 420 and the diameter of the shell 430 are shown as being uniform or substantially uniform, each photonic crystal 410, or particular pairs or sets of photonic crystals 410 may have different diameters with each diameter tuned to reflect a particular wavelength of infrared light such as described above.

For example, the core 420 and the shell 430 of a first photonic crystal 410 in the photonic crystal structure 400 may have a first diameter and a second diameter respectively, while the core 420 and the shell 430 of a second photonic crystal 410 in the photonic crystal structure 400 may have a third diameter and a fourth diameter respectively.

The photonic crystal structure 400, and more specifically, each photonic crystal 410 in the photonic crystal structure 400, may be suspended in a liquid, a transparent ink or another fluid. This liquid may then be applied to a surface of a device, such as, for example a housing or a cover glass of an electronic device, to create an infrared reflective layer or coating on the device. Once the liquid evaporates, the photonic crystal structure 400 may be sealed to the surface with a hard coat, laminate, glue and the like.

Figure 5:
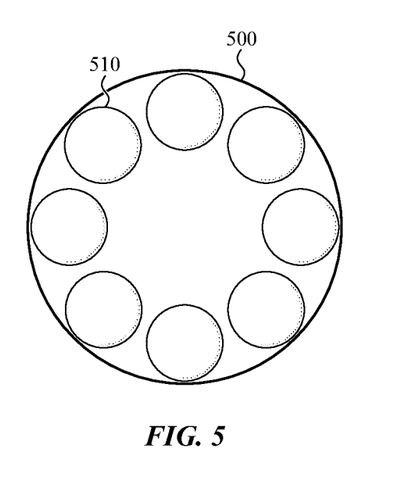
FIG. 5 illustrates another example structure that may be used to produce an infrared reflective layer according to one or more embodiments of the present disclosure.

FIG. 5 illustrates another example structure that may be used to produce an infrared reflective layer according to one or more embodiments of the present disclosure. In this particular embodiment, one or more particles 510 are suspended in a capsule 500 or other such structure. The particles 510 may be a type of photonic crystal such as described above. For example, the particles 510 may be polymer spheres, hollow spheres and the like.

The capsule 500 may be a polymer and may be filled with a liquid or fluid. The liquid may have a first refractive index while the particles 510 have a second refractive index. In another implementation, such as, for example, when the particles 510 are hollow spheres such as described above with respect to FIG. 4, a core of the hollow sphere may have a first refractive index while a shell of the hollow sphere may have a second refractive index.

In order to arrange the particles 510 within the capsule 500, osmotic pressure may be applied to the capsule 500. The osmotic pressure may move or otherwise arrange each of the particles 510 into a desired arrangement or structure. As discussed above, the structure may be a three-dimensional array, a cubic lattice and the like.

Once the particles 510 have been arranged in a desired manner, the capsule 500 may be applied to a substrate, a cover glass, a housing or other material. In some implementations, the capsule 500 may be placed in a fluid, a transparent ink, a resin or other substance which may be subsequently screen printed, sprayed or otherwise applied to a surface of a device or structure.

Figure 6:
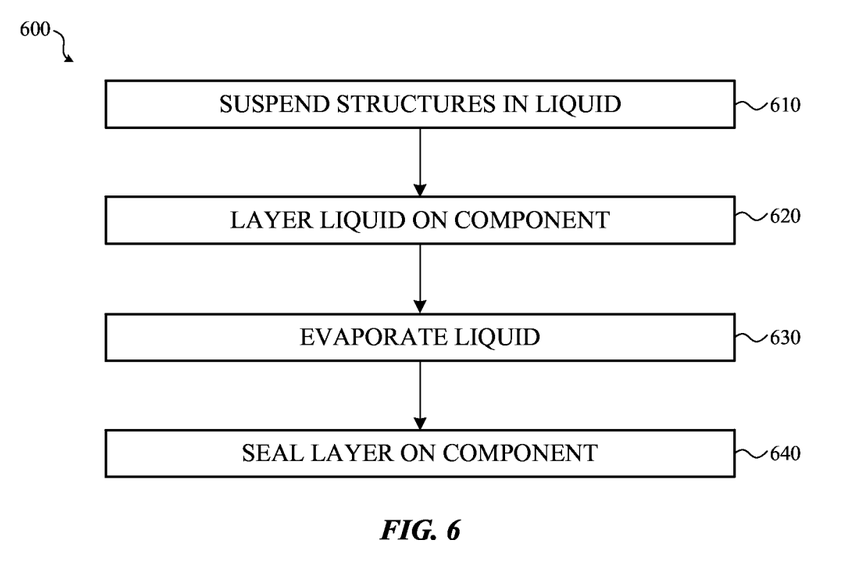
FIG. 6 illustrates a method for applying an infrared layer to a component of a device according to one or more embodiments of the present disclosure.

FIG. 6 illustrates a method 600 for applying an infrared reflective layer on a component of an electronic device according to one or more embodiments of the present disclosure. More specifically, the method 600 may be used to create an infrared reflective layer having photonic crystals and subsequently applying the infrared reflective layer to a cover glass, a housing or other structure of an electronic device, such as, for example, electronic device 100 (FIG. 1).

Method 600 begins at operation 610 in which one or more structures, materials or particles are suspended in a second material such as, for example, a liquid. In some embodiments, the structures are photonic crystals. More specifically, the structures may be polymeric structures having a particular shape.

In some implementations the polymeric structures are spheres although other structures (e.g., square structures, rectangular structures, triangular structures and the like) may be used. The structures may have a core having a first diameter and a first refractive index and a shell having a second diameter and a second refractive index such as described above.

Once the structures have been suspended in the liquid, flow proceeds to operation 620 in which the liquid is layered on or otherwise applied to a component. As discussed above, the component may be a component of an electronic device such as, for example, a cover glass, a housing or other such structure or surface.

Once the liquid has been layered on the component, the liquid is evaporated 630 which yields a photonic crystal structure. The photonic crystal structure may be arranged in a three-dimensional array or a cubic lattice such as described above.

Flow then proceeds to operation 640 and the photonic crystal structure is sealed thereby creating an infrared reflective layer. As discussed above, the seal may be a glue, a hard coat, a laminate and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   a display having a cover glass and a display stack configured to emit visible light through the cover glass; and
   an infrared reflective layer disposed on the cover glass comprising:
      a first portion having a first refractive index; and
      a second portion having a second refractive index, wherein the second portion is formed in the first portion as a three-dimensional array of gas-filled cavities spaced to reflect infrared light.

2. The electronic device of claim 1, wherein the second portion comprises hollow polymer spheres that form the gas-filled cavities.

3. The electronic device of claim 1, wherein the first portion comprises a first material and the cavities are formed by laser etching the first material.

4. The electronic device of claim 1, wherein the infrared reflective layer is positioned below the cover glass.

5. A substrate for an electronic device comprising:
   a first infrared reflective layer comprising a first array of photonic crystals sized and spaced to reflect a wavelength of light; and
   a second infrared reflective layer on the first infrared reflective layer, wherein the second infrared reflective layer comprises a second array of photonic crystals sized and spaced to reflect the wavelength of light, wherein the photonic crystals in the first array of photonic crystals are aligned with the photonic crystals in the second array of photonic crystals to form a cubic lattice of photonic crystals between the first and second infrared reflective layers, and wherein the cubic lattice of photonic crystals is configured to maintain an index of refraction between the first and second infrared reflective layers.

6. The substrate of claim 5, wherein a diameter of each photonic crystal in the first and second arrays is between approximately 350 nm and approximately 550 nm.

7. The substrate of claim 5, wherein a spacing between each photonic crystal in the first and second arrays of photonic crystals is between approximately 350 nm and approximately 550 nm.

8. The substrate of claim 5, further comprising a third infrared reflective layer comprising a third array of photonic crystals sized and spaced to reflect an additional wavelength of light that is different from the wavelength of light.

9. The substrate of claim 5, wherein the first array of photonic crystals comprises hollow structures.

10. The substrate of claim 9, wherein the hollow structures comprise a vacuum.

11. An electronic device comprising:
    a display having a cover glass and a display stack configured to emit visible light, wherein the cover glass covers the entire display; and
    an infrared reflective layer on the cover glass and comprising an array of photonic crystals configured to reflect infrared light while transmitting the visible light emitted by the display, wherein the array of photonic crystals comprises photonic crystals having a shell and a hollow portion surrounded by the shell and wherein the infrared reflective layer covers the entire cover glass.

12. The electronic device defined in claim 11, wherein the infrared reflective layer is interposed between the cover glass and the display stack.

13. The electronic device defined in claim 12, wherein the array of photonic crystals is sized and spaced to reflect a first band of infrared light, further comprising:
    an additional infrared reflective layer interposed between the infrared reflective layer and the display stack, wherein the additional infrared reflective layer comprises an additional array of photonic crystals sized and spaced to reflect a second band of infrared light that is different from the first band of infrared light while transmitting the visible light emitted by the display.

14. The electronic device defined in claim 11, wherein the cover glass is interposed between the display stack and the infrared reflective layer.

15. The electronic device defined in claim 11, further comprising:
    a housing that extends around a periphery of the electronic device, wherein the cover glass and the housing enclose the display stack within the electronic device.

16. The electronic device defined in claim 11 wherein the hollow portion of the photonic crystals comprises a vacuum.

17. The electronic device defined in claim 11 wherein the hollow portion of the photonic crystals comprises a gas.

* * * * *